United States Patent
Li et al.

(10) Patent No.: US 11,263,174 B2
(45) Date of Patent: Mar. 1, 2022

(54) REDUCING RESOURCE CONSUMPTION IN CONTAINER IMAGE MANAGEMENT

(71) Applicant: International Business Machines Corporation, Armonk, NY (US)

(72) Inventors: Guang Cheng Li, Beijing (CN); Yong Zheng, Beijing (CN); Qi Ming Teng, Beijing (CN); Lin Feng Shen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 16/678,290

(22) Filed: Nov. 8, 2019

(65) Prior Publication Data

US 2021/0141760 A1  May 13, 2021

(51) Int. Cl.
| | | |
|---|---|---|
| *G06F 16/13* | (2019.01) | |
| *G06F 16/14* | (2019.01) | |
| *G06F 16/182* | (2019.01) | |

(52) U.S. Cl.
CPC .......... *G06F 16/134* (2019.01); *G06F 16/148* (2019.01); *G06F 16/156* (2019.01); *G06F 16/1824* (2019.01)

(58) Field of Classification Search
CPC ... G06F 16/1824; G06F 16/134; G06F 16/156
See application file for complete search history.

(56) References Cited

U.S. PATENT DOCUMENTS 8,015,237 B2 *  9/2011  Muller ............... H04N 7/17309
                                             709/201
2018/0095973 A1   4/2018  Huang et al.
2018/0129749 A1   5/2018  Hu
2019/0251190 A1 * 8/2019  Scrivano ............... G06F 3/0643

OTHER PUBLICATIONS

Ericeira et al., "Detection of masses based on asymmetric regions of digital bilateral mammograms using spatial description with variogram and cross-variogram functions," Computers inBiologyand-Medicine43(2013)987-999.
Wang et al., "Computerized Detection of Breast Tissue Asymmetry Depicted on Bilateral Mammograms: A Preliminary Study of Breast Risk Stratification," Acad Radiol. Oct. 2010; 17(10): 1234-1241. doi:10.1016/j.acra.2010.05.016.

* cited by examiner

*Primary Examiner* — Loc Tran
(74) *Attorney, Agent, or Firm* — Patterson + Sheridan, LLP (57) ABSTRACT

Method and apparatus for reducing resource consumption in container image management. Embodiments include receiving directory information and checksum information corresponding to a plurality of files of a container image. Embodiments include determining, based on the directory information and the checksum information, whether each file of the plurality of files is present in a repository. For each respective file of the plurality of files that is determined to be present in the repository, embodiments include updating a file list for the container image to indicate a respective location in the repository of the respective file. For each given file of the plurality of files that is determined not to be present in the repository, embodiments include storing the given file at a given location in the repository and updating the file list for the container image to indicate the given location in the repository of the given file.

12 Claims, 8 Drawing Sheets

| IMAGE ID | LAYER ID | FILE ID | CHECKSUM | LOCATION |
|---|---|---|---|---|
| OS2 | Layer1 | /usr/lib64/libc-2.17.20 | a188418f0f8cd2a1fcfa21856a986044 | /path/to/1st/file |
| OS2 | Layer1 | /usr/lib64/libaio.so.1.0.0 | 30e03f3e04f43ebfed720c41546c15ac | /path/to/2nd/file |
| OS2 | Layer2 | /usr/lib64/libdb-5.3.so | 688c8f7e7257ac80ae25da3be74f27bc | /path/to/3rd/file |

| FILE ID | CHECKSUM | IMAGE ID | LAYER ID |
|---|---|---|---|
| /usr/lib64/libc-2.17.20 | a188418f0f8cd2a1fcfa21856a986044 | OS1 | Layer1 |
| /usr/lib64/libc-2.17.20 | a188418f0f8cd2a1fcfa21856a986044 | OS2 | Layer3 |
| /usr/lib64/libaio.so.1.0.0 | 30e03f3e04f43ebfed720c41546c15ac | OS1 | Layer1 |
| /usr/lib64/libdb-5.3.so | 688c8f7e7257ac80ae25da3be74f27bc | OS1 | Layer2 |

REDUCING RESOURCE CONSUMPTION IN CONTAINER IMAGE MANAGEMENT

BACKGROUND

The present invention relates to container image management, and more specifically, to using checksums to reduce duplication of storage and transmission of container image files.

Applications are increasingly executed within containers. A container image is generally a read-only template that is used to build a container, such as a container for an application or operating system. For example, clients may send/obtain container images to/from an image server. Depending on a function of a given container, a size of a corresponding container image may reach several gigabytes. Furthermore, many container images may include the same files as other container images, resulting in large amounts of duplicate files transmitted by clients and stored by the image server. For example, container images corresponding to different instances of the same operating system may include many duplicate files, and may only differ in certain user-specific files. As such, there is a need in the art for techniques to reduce resource consumption in container image management.

SUMMARY

According to one embodiment of the present invention, a computer-implemented method is disclosed. The method generally includes: receiving, by an image server, from a client device, directory information and checksum information corresponding to a plurality of files of a container image; determining, by the image server, based on the directory information and the checksum information, whether each file of the plurality of files is present in a repository; for each respective file of the plurality of files that is determined by the image server to be present in the repository, updating, by the image server, a file list for the container image to indicate a respective location in the repository of the respective file; and for each given file of the plurality of files that is determined by the image server not to be present in the repository: storing, by the image server, the given file at a given location in the repository; and updating, by the image server, the file list for the container image to indicate the given location in the repository of the given file.

In another aspect, a computer-implemented system is disclosed. The computing system comprises a computer processor coupled to a computer-readable memory unit, where the memory unit comprises instructions that when executed by the computer processor implements the above method.

In another aspect, a computer-implemented method is disclosed. The method generally includes: calculating, by a client device, checksums for a plurality of files of a container image; sending, by the client device, the checksums and directory information related to the plurality of files to an image server; receiving, by the client device, an indication from the image server to send a subset of the plurality of files; and sending, by the client device, the subset of the plurality of files to the image server.

It is to be understood that the summary is not intended to identify key or essential features of embodiments of the present invention, nor is it intended to be used to limit the scope of the present embodiment. Other features of the present embodiment will become easily comprehensible through the description below.

DETAILED DESCRIPTION

Generally, container images can be pushed to and pulled down from an image server by a client device. A container image generally includes files organized into a plurality of layers, and is defined via metadata indicating the composition and organization of the plurality of layers. In some embodiments, layers allow new data to be added to an existing container image, such as updates to an operating system. Duplicate files across layers of different container images can result in large amounts of resource consumption, such as storage resources on the image server and network resources used to transmit the files from client devices to the image server. As such, techniques described herein operate to reduce or eliminate the unnecessary storage and transmission of duplicate files.

In certain embodiments, before performing a push operation, a client device calculates a checksum of each file in a container image before transmitting any files in the container image to the image server. A checksum generally refers to a fixed-size datum computed from a block of digital data for the purpose of detecting duplicate files or differences between files by comparing the checksums of the files. After computing the checksums, in certain embodiments, the client device sends the checksums along with metadata for the container image (e.g., indicating identifiers of directories, files, and layers of the container image) to the image server. The image server then determines whether any files in the container image are duplicates of files already stored in a repository managed by the image server. In an example, the image server compares file identifiers and checksums received from the client device with file identifiers and checksums of files in the repository in order to identify matching files. If any files are determined to be duplicates, then the image server determines that it does not need to store these files for the container image, instead updating a file list for the container image to include references to locations in the repository at which existing versions of the duplicate files are stored. In some embodiments, the image server updates metadata associated with the existing versions of the duplicate files in the repository to indicate that they are being referenced by the container image.

In certain embodiments, in order to reduce network resource consumption, the image server sends an indication to the client device to only send files that were not determined to be duplicates. For example, in order to notify the client device of which files not to send, the image server may send a list of files determined to be duplicates. In alternative embodiments, a list of files determined not to be duplicates may be sent to the client device, although this list may be larger than the list of files determined to be duplicates. As such, the client device only transmits files that are not duplicates of files already stored in the repository to the image server. The image server stores the received files and updates the file list for the container image to indicate locations in the repository of the received files. In some embodiments, the image server also updates metadata associated with the received files stored in the repository to indicate that they are being referenced by the container image.

When the image server receives a request from a client device to pull the container image, it uses the file list for the container image to retrieve all of the files in the container image from their respective locations in the repository and then generates the container image with all of the files. For example, the image server may generate a compressed file of each layer and combine the compressed files into an image file to send to the client device. The image server then sends the image file to the client device.

As such, techniques described herein reduce storage resources at the image server by preventing storage of duplicate files. Furthermore, because checksums are calculated by client devices rather than the image server, the processing resources of the image server remain available for other tasks. Additionally, by avoiding transmission of duplicate files from client devices to the image server, network resource consumption is reduced. Accordingly, techniques described herein constitute a technical solution to the technical problem posed by the potentially large amounts of resources conventionally required to transmit and store container images. By reducing storage, transmission, and processing resource consumption for container image management, embodiments of the present disclosure improve the functioning of computer systems.

Figure 1:
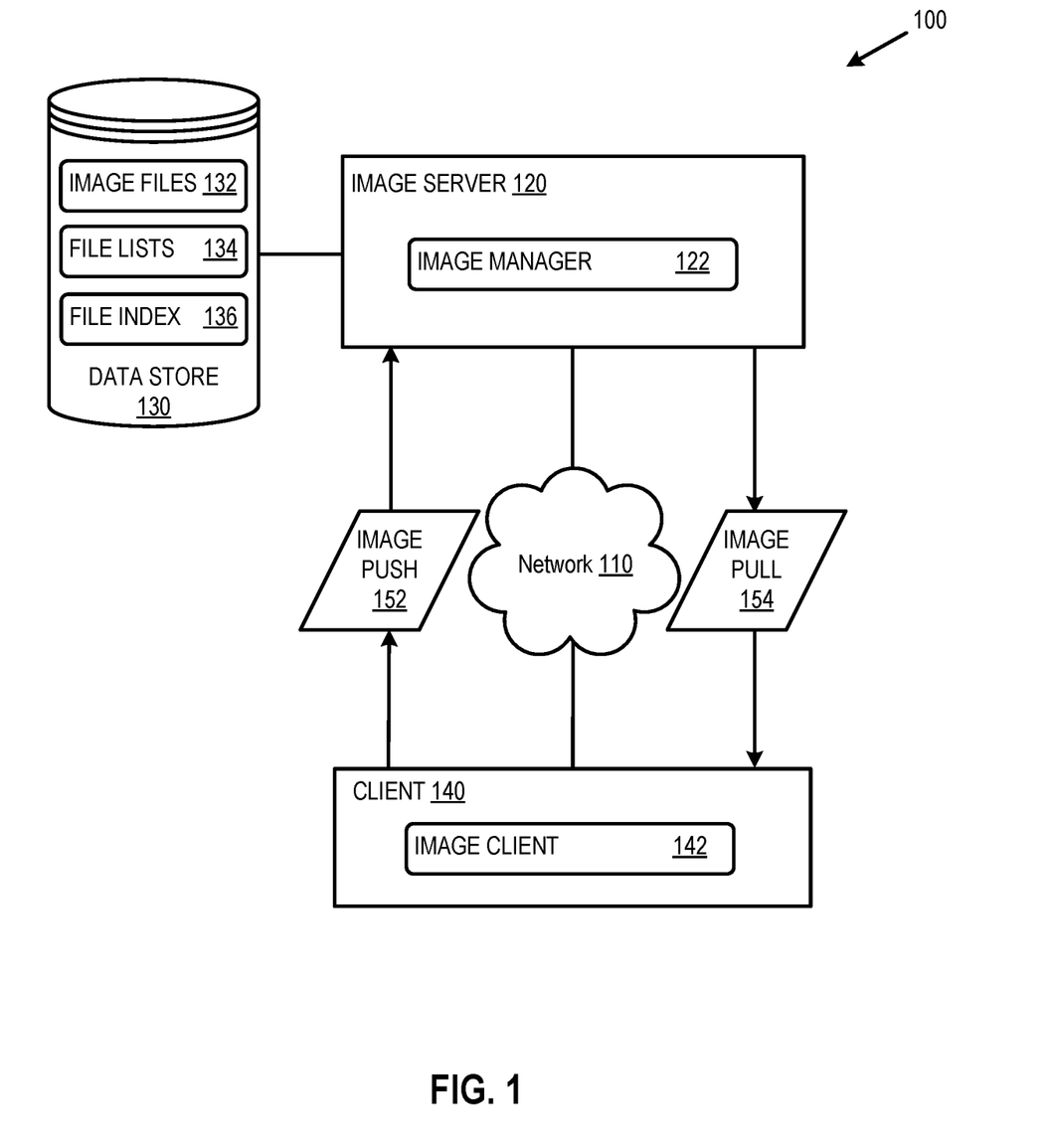
FIG. 1 depicts a computing environment in which techniques for reducing resource consumption in container image management may be implemented.

FIG. 1 depicts an example computing environment 100 in which techniques for reducing resource consumption in container image management may be implemented. FIG. 1 is described in conjunction with FIG. 2, which illustrates an example of layers of a container image 200, FIG. 3, which illustrates an example file list 300 for a container image, and FIG. 4, which illustrates an example file index 400 for container image management.

Computing environment 100 includes image server 120 and client 140, connected via network 110. Network 110 generally represents a connection over which data may be transmitted, such as a local area network (LAN), wide area network (WAN), cellular data network, the Internet, or the like. Image server 120 generally represents a computing device such as a server computer, and comprises image manager 122, which performs operations related to reducing resource consumption in container image management. In certain embodiments, image manager 122 receives and processes push and pull operations from client devices, such as client 140, with respect to container images stored in data store 130. Client 140 generally represents a computing device such as a laptop or desktop computer, tablet computer, mobile device, or the like. In some embodiments, a user of client 140 interacts with image client 142 in order to initiate push and pull operations with respect to container images.

A software "container" is a form of computer virtualization, which isolates execution of one or more programs (and files or file systems) with regard to other programs and resources of a computer. A container is an executable (e.g., "run-time") entity that may reference one or more container "images" and may establish a context for running a program or set of programs using, or included as, components of a container image.

A container may allocate or activate processes or resources of a computing system, such as client 140. The processes and resources may be used to run programs interacting with or included in a container image. An image may include program and/or data files, which may include files required for the container to execute. The programs or files contained in an image may be included in a file system (e.g., a set of files and a directory structure organizing the files), or a portion thereof. A file system included in or referenced by components of an image may be the entirety, or a portion of a host (e.g., an underlying operating system) file system.

Figure 2:
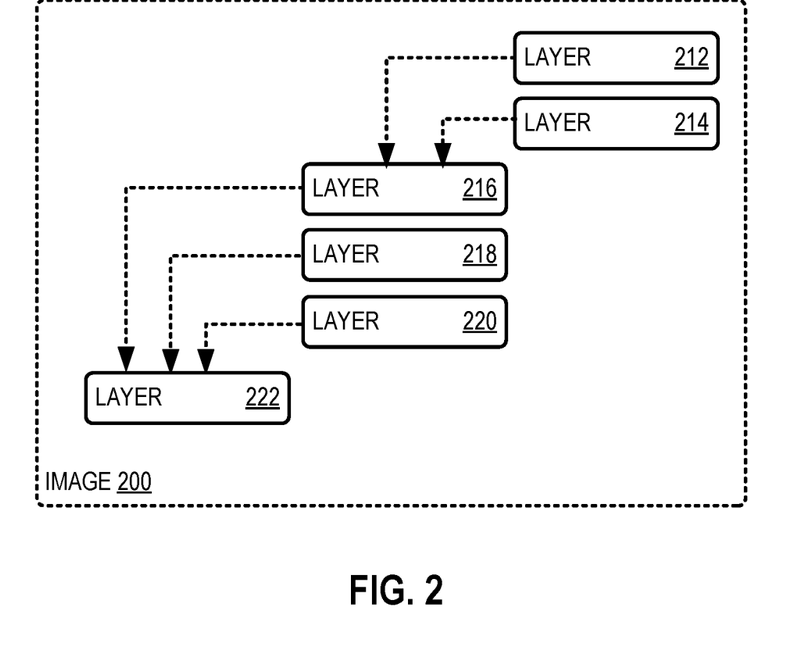
FIG. 2 illustrates an example of layers of a container image.

FIG. 2 depicts layers of a container image 200. Container image 200 includes a plurality of layers 212-222 that are interconnected. For example, layers 212 and 214 are connected to layer 216, while layers 216, 218, and 220 are connected to layer 222. These interconnections generally reflect hierarchical relationships between layers. For example, layer 222 may represent an initial release of a software application, layers 216, 218, and 220 may represent subsequent updates or patches to the software application, and layers 212 and 214 may represent additional updates to portion of the software application previously updated or patched by layer 216.

Executing, or "running", a process within a container may entail executing programs within the image(s), or programs referencing components of the image(s), of the container on a computer. Executing a process within a container may also include interacting with the programs included in the container image (e.g., via an operating system command line or graphical user interface, or by means of other programs). Hereinafter, "executing", or "running", a container is understood to mean executing programs within, or referenced by, a container image, as well as interacting (e.g., by a user or another program) with the components (e.g., programs, files, or file systems) of the container image.

Image client 142 may execute containers based on container images managed by image manager 122. In some embodiments, client 140 sends container images to image server 120 for storage in data store 130 and pulls container images from image manager 122 in order to load and execute containers based on the container images. Client 140 may be representative of a plurality of clients that push and pull container images to and from image server 120.

Data store 130 generally represents a data storage entity such as a repository or database, and comprises image files 132, file lists 134, and file index 136. Image files 132 generally represent files that relate to a plurality of container images. File lists 134 generally include metadata associated with each given container image listing the files that make up the layers of the given container image, and indicating locations of the files in data store 130.

Figure 3:
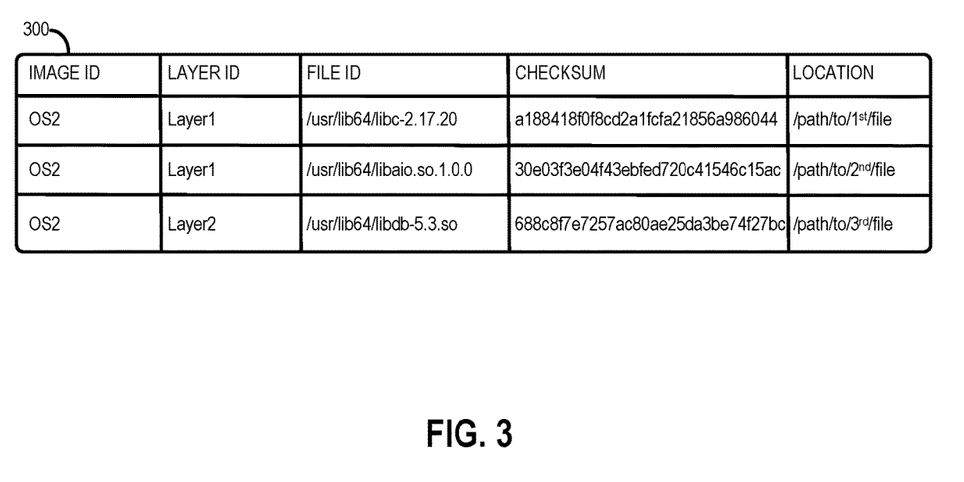
FIG. 3 illustrates an example file list for a container image.

For example, FIG. 3 depicts an example file list 300 listing the files that make up a container image having an image ID of "OS2". In an example, file list 300 relates to a container image for a build of a particular operating system.

Each file in file list 300 is associated with the image ID of the container image, a layer ID indicating a layer of the container image to which the file belongs, a file ID (e.g., a directory path and file name of the file within the container image), a checksum (e.g., that is calculated by image client 142 and sent to image manager 122), and a location in data store 130 at which the file is stored (e.g., an address or directory within data store 130).

File index 136 generally represents an index of files stored in data store 130 (e.g., an index of image files 132), indicating to which container images each file corresponds.

Figure 4:
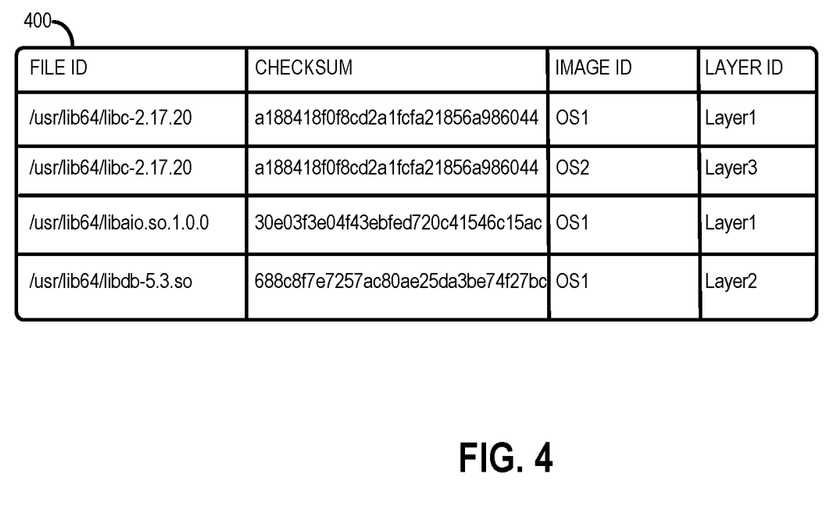
FIG. 4 illustrates an example file index for container image management.

FIG. 4 illustrates an example file index 400, in which each file is associated with a file identifier (e.g., a directory path and file name of the file within the container image), a checksum of the file, image IDs of container images to which the file corresponds, and layer IDs of the layers within the container images to which the file corresponds. Files that correspond to more than one container image will be associated in file index 400 with an image ID and layer ID for each layer of each container image to which the file corresponds. For example, the file "/usr/lib64/libc-2.17.20" is associated with "Layer1" of the container image "OS1" as well as "Layer3" of the container image "OS2". This indicates that an identical version of the file "/usr/lib64/libc-2.17.20" is present in both OS1 and OS2.

In an example, image client 142 performs an image push 152 in which image client 142 first computes a checksum for each file in a container image and sends metadata indicating the files that are present in the container image along with the checksum for each file to image manager 122. Image manager 122 then uses the metadata and checksums to determine if any files in the container image are duplicates of files already present in image files 132 in data store 130. In an example, image manager 122 queries file index 136 for a file identifier and checksum of each file to determine whether there is an entry in file index 136 with the same file identifier and checksum. For example, if the metadata and checksums indicate that the container image contains the file "/usr/lib64/libc-2.17.20" with the checksum "a188418f0f8cd2a1fcfa21856a986044", then image manager 122 may determine that this file is already present in data store 130, as shown in file index 400 of FIG. 4. As such, image manager 122 determines that this file does not need to be stored for the container image, and updates a file list for the container image to indicate the location of the existing version of the file in data store 130.

For example, as shown in FIG. 3, file list 300 indicates that the file "/usr/lib64/libc-2.17.20" with the checksum "a188418f0f8cd2a1fcfa21856a986044" is stored at the location "/path/to/1$^{st}$/file" in data store 130. Furthermore, image manager 122 updates file index 136 to indicate that the file is being referenced by the container image. For example, as shown in FIG. 4, file index 400 may be updated to include an image ID of "OS2" in addition to "OS1" associated with the file "/usr/lib64/libc-2.17.20."

Furthermore, in some embodiments, image manager 122 sends an indication to image client 142 not to send files determined to be duplicates, such as the file "/usr/lib64/libc-2.17.20." Image client 142 then sends files for the container image that were not determined to be duplicates to image manager 122. Image manager 122 then stores the images in data store 130, updates the file list for the container image to indicate the locations in data store 130 at which the files are stored, and updates file index 136 to include the details of the files.

In another example, image client 142 retrieves a container image from image manager 122 via an image pull 154. For example, image client 142 may send a request to retrieve a given container image. Image manager 122 then uses a file list 134 of the given container image to determine locations in data store 130 of all of the files in the container image, and retrieves the files from the locations. Image manager 122 then generates an image with all of the files organized into layers as indicated in the file list 134 for sending to image client 142. In one example, a tar.gzip file is generated for each layer of the given container image, and the layer files are combined into an image. Image manager 122 then sends the image to image client 142. Image client 142 may then build and execute the container based on the image.

Figure 5A:
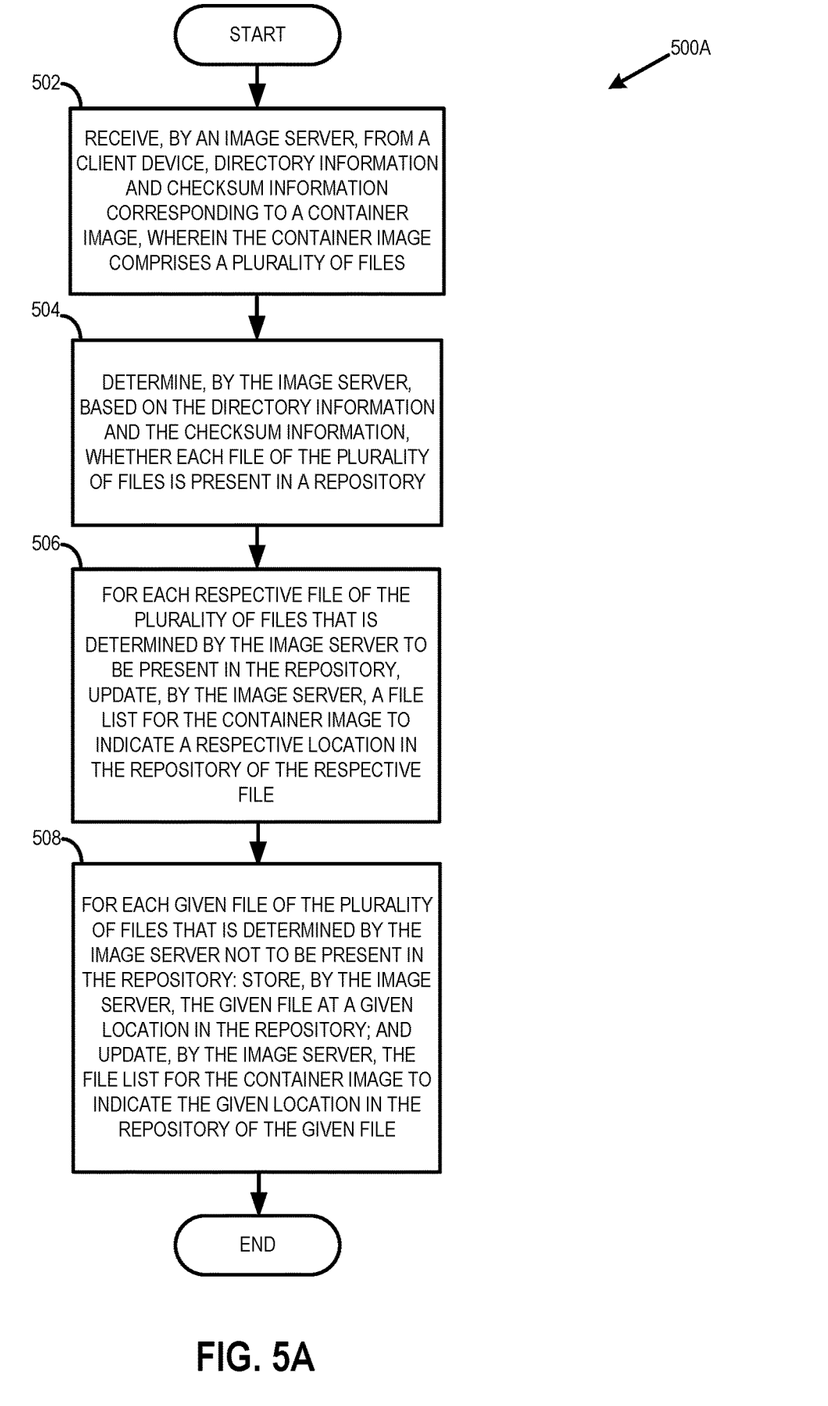
FIG. 5A illustrates example operations for reducing resource consumption in container image management.

FIG. 5A illustrates example operations 500A for reducing resource consumption in container image management. In an example, operations 500A are performed by image manager 122 of FIG. 1 as part of a push operation initiated by client 140 of FIG. 1.

At step 502, an image server receives, from a client device, directory information and checksum information corresponding to a container image, wherein the container image comprises a plurality of files. In some embodiments, image manager 122 of FIG. 1 receives metadata indicating the directory paths and file names of all files in the container image as well as checksums for each file from client 142. The checksums may have been calculated by image client 142 of FIG. 1. As used herein, "directory information" may include information related to directory paths and files of a container image, such as metadata indicating directory paths and file names.

At step 504, the image server determines, based on the directory information and the checksum information, whether each file of the plurality of files is present in a repository. For example, image manager 122 of FIG. 1 may query file index 136 of FIG. 1 using a file identifier from the directory information and a checksum for each file to determine whether the file is already present in data store 130 of FIG. 1.

At step 506, for each respective file of the plurality of files that is determined by the image server to be present in the repository, the image server updates a file list for the container image to indicate a respective location in the repository of the respective file. In an example, image manager 122 of FIG. 1 generates the file list (e.g., one of file lists 134 of FIG. 1) based on the directory information and the checksum information received at step 502, and updates an entry in the file list corresponding to each respective file that is determined at step 504 to be present in data store 130 of FIG. 1 to indicate a location in data store 130 at which the respective file is stored. Furthermore, in some embodiments, image manager 122 also updates a file index (e.g., file index 136 of FIG. 1) to indicate that each respective file that is determined at step 504 to be present in data store 130 of FIG. 1 is referenced by the container image.

At step 508, for each given file of the plurality of files that is determined by the image server not to be present in the repository, the image server stores the given file at a given location in the repository and updates the file list for the container image to indicate the given location in the repository of the given file. In certain embodiments, image manager 122 of FIG. 1 sends an indication to image client 142 of FIG. 1 to only send the files determined not to be present in the repository, such as by sending a list of all files determined to be present in the repository or a list of all files determined not to be present in the repository to image client 142 of FIG. 1, and image client 142 of FIG. 1 sends only the files determined not to be present in the repository. Image manager 122 of FIG. 1 receives these files and stores them in data store 130, updating the file list 134 of FIG. 1 to indicate the locations at which the files are stored. Furthermore, in some embodiments, image manager 122 also updates the file index (e.g., file index 136 of FIG. 1) to indicate locations in data store 130 at which these files are stored and that each of these files is referenced by the container image.

Figure 5B:
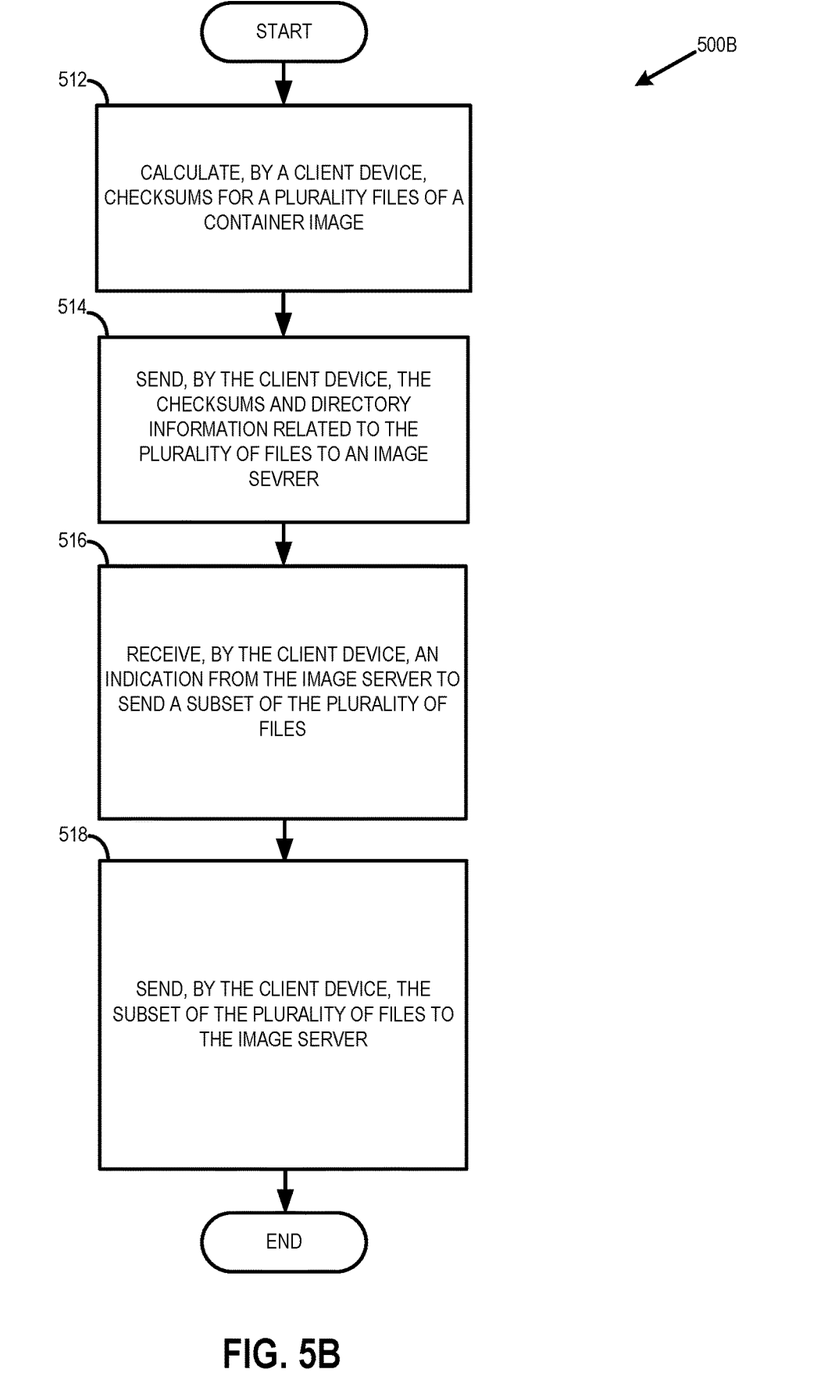
FIG. 5B illustrates additional example operations for reducing resource consumption in container image management.

FIG. 5B illustrates additional example operations 500B for reducing resource consumption in container image management. In an example, operations 500B are performed by image client 142 of FIG. 1 as part of a push operation.

At step 512, a client device calculates checksums for a plurality of files of a container image. In an example, image client 142 of FIG. 1 calculates a checksum for each of the plurality of files.

At step 514, the client device sends the checksums and directory information related to the plurality of files to an image server. In an example, image client 142 of FIG. 1 sends the checksums along with metadata indicating the directory path and file name of each file of the plurality of files to image manager 122 of FIG. 1.

At step 516, the client device receives an indication from the image server to send a subset of the plurality of files. In an example, image manager 122 of FIG. 1 determines based on the checksums and directory information that some of the plurality of files are already present in data store 130 of FIG. 1, and sends the indication to image client 142 of FIG. 1 to only send the subset of the plurality of files that were determined not to be present in data store 130 of FIG. 1. The indication may include either a list of the files determined to be present in data store 130 of FIG. 1 or a list of the files determined not to be present in data store 130 of FIG. 1 (e.g., the subset).

At step 518, the client device sends the subset of the plurality of files to the image server. In an example, image client 142 of FIG. 1 sends the subset of the plurality of files to image manager 122 of FIG. 1, and image manager 122 of FIG. 1 stores the subset of the plurality of files in data store 130 of FIG. 1. In some embodiments, the client device subsequently requests the container image from the image server, and the image server generates an image including the plurality of files (e.g., retrieved from respective locations in data store 130 of FIG. 1) and sends the image to the client device in response to the request.

Figure 6:
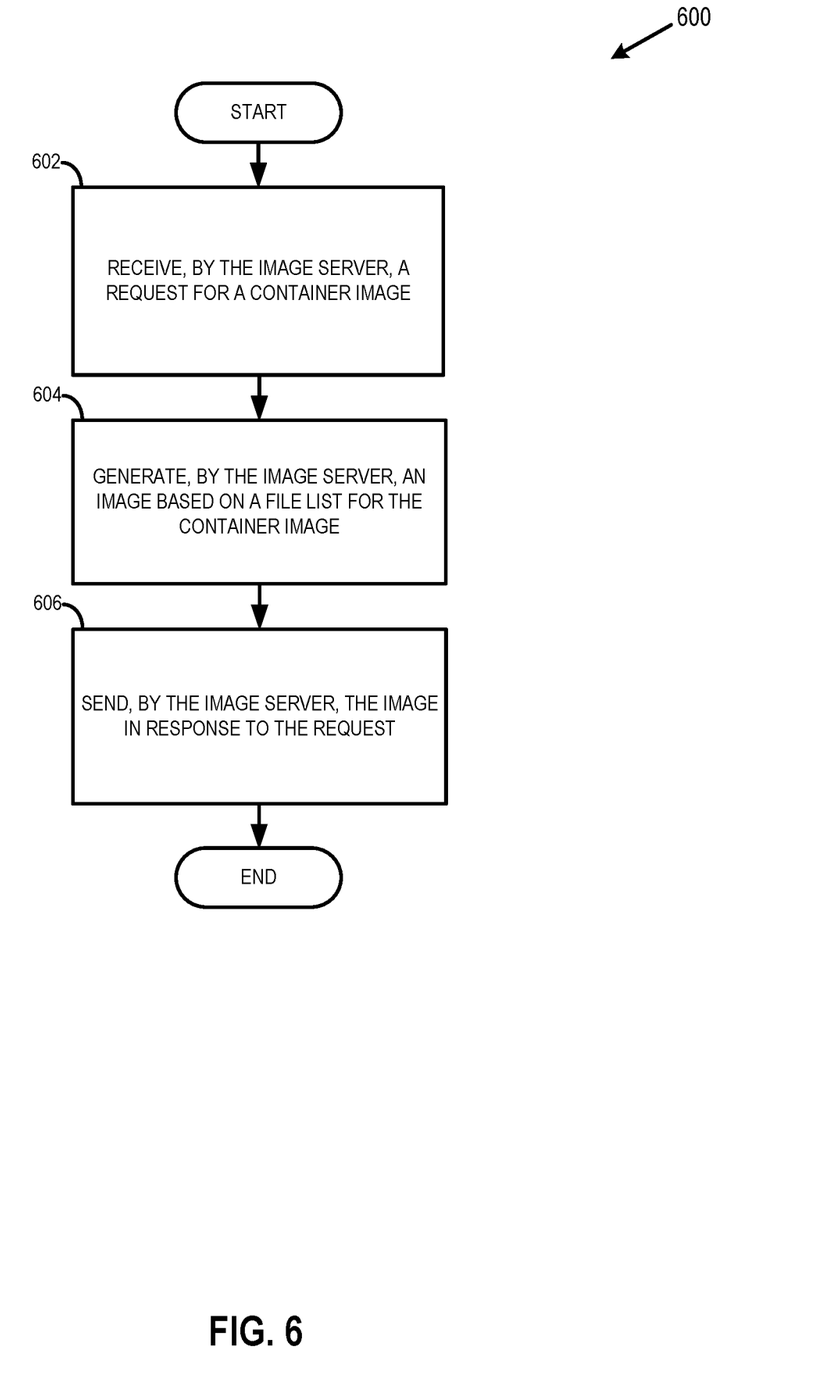
FIG. 6 illustrates additional example operations for reducing resource consumption in container image management.

FIG. 6 illustrates additional example operations 600 for reducing resource consumption in container image management. In an example, operations 600 are performed by image manager 122 of FIG. 1 as part of a pull operation initiated by client 140 of FIG. 1.

At step 602, an image server receives a request for a container image. For example, the request may be received from a client such as image client 142 of FIG. 1, and may include an identifier of the container image that is requested.

At step 604, the image server generates an image based on a file list for the container image. In an example, image manager 122 of FIG. 1 retrieves a file list 134 of FIG. 1 that corresponds to the container image (e.g., based on an identifier included in the request), and determines locations in data store 130 of FIG. 1 at which all files in the container image are stored based on information in the file list 134. Image manager 122 of FIG. 1 retrieves all of the files from their respective locations and generates the image based on the files, such as by generating a zip file for each layer of the container image (e.g., based on layer information in the file list 134 of FIG. 1) and combining the zip files to produce the image.

At step 606, the image server sends the image in response to the request. In an example, image manager 122 of FIG. 1 sends the image generated at step 604 to image client 142 of FIG. 1 to complete the pull operation. Image client 142 of FIG. 1 may then build and execute the container represented by the container image based on the received image.

Figure 7:
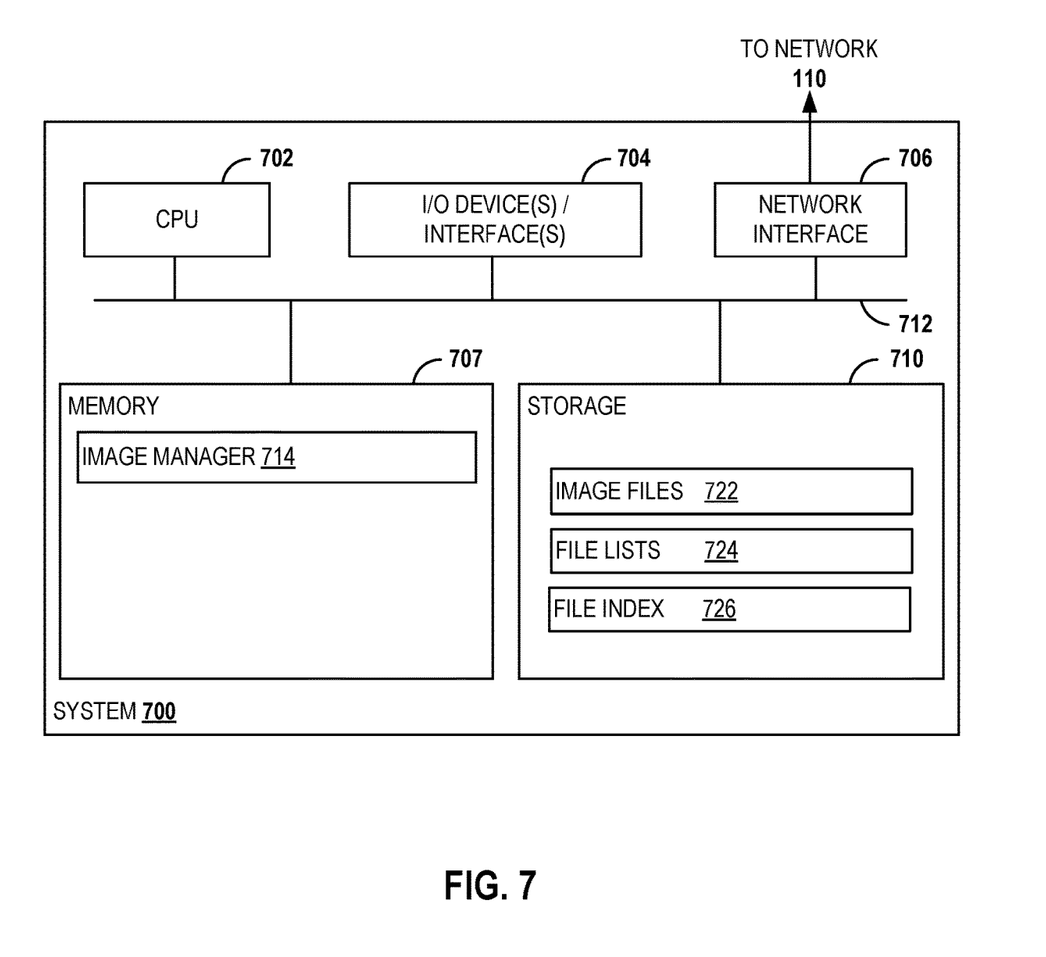
FIG. 7 illustrates an example computing system for container image management.

FIG. 7 depicts a computing system 700 with which embodiments of the present disclosure may be implemented. For example, computing system 700 may represent image server 120 of FIG. 1. In some embodiments, components of computing system 700 (e.g., hardware components) may represent aspects of client 140 of FIG. 1.

System 700 includes a central processing unit (CPU) 702, one or more I/O device interfaces 704 (that may provide connections for various I/O devices 704, such as keyboards, displays, mouse devices, and the like) to the system 700, network interface 706 (e.g., a physical network interface card), memory 708, storage 710, and an interconnect 712. It is noted that one or more components of system 700 may alternatively be located remotely and accessed via a network, such as network 110. It is further contemplated that one or more components of system 700 may comprise physical or virtualized components.

CPU 702 may receive and execute instructions stored in memory 708. Similarly, the CPU 702 may receive and store data related to applications in memory 708. The interconnect 712 transmits programming instructions and application data, among the CPU 702, I/O device interface 704, network interface 706, memory 708, and storage 710. CPU 702 is included to be representative of a single CPU, multiple CPUs, a single CPU having multiple processing cores, and other arrangements.

Additionally, the memory 708 may represent a random access memory. Storage 710 may be a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN).

Storage 710 comprises image files 722, file lists 724, and file index 726, which may represent image files 132, files lists 134, and file index 136 of FIG. 1.

As shown, memory 708 includes image manager 714, which may be representative of image manager 122 of FIG. 1.

The present invention may be a system, a method, and/or a computer program product. The computer program product may include a computer readable storage medium (or media) having computer readable program instructions thereon for causing a processor to carry out aspects of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications such as an image manager or related data available in the cloud. For example, the image manager could execute on a computing system in the cloud and client systems could push and pull container images to and from the image manager on the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for reducing resource consumption in container image management, comprising:
  receiving, by an image server, from a client device, directory information and checksum information corresponding to a plurality of files of a container image;
  determining, by the image server, based on the directory information and the checksum information, whether each file of the plurality of files is present in a repository;
  sending, by the image server, to the client device, an indication to only transmit given files of the plurality of files determined by the image server not to be present in the repository, wherein the indication comprises one of:
    a list of the given files of the plurality of files determined by the image server not to be present in the repository; or
    a list of respective files of the plurality of files determined by the image server to be present in the repository;
  receiving, by the image server, from the client device, the given files of the plurality of files determined by the image server not to be present in the repository;
  for each respective file of the plurality of files that is determined by the image server to be present in the repository, updating, by the image server, a file list for the container image to indicate a respective location in the repository of the respective file; and
  for each given file of the plurality of files that is determined by the image server not to be present in the repository:
    storing, by the image server, the given file at a given location in the repository; and
    updating, by the image server, the file list for the container image to indicate the given location in the repository of the given file.

2. The method of claim 1, wherein determining, by the image server, based on the directory information and the checksum information, whether each respective file of the plurality of files is present in the repository comprises querying a file index using an identifier and a checksum of each respective file of the plurality files.

3. The method of claim 2, further comprising, for each respective file of the plurality of files that is determined by the image server to be present in the repository, updating, by the image server, the file index to include a respective identifier and a respective checksum of the respective file.

4. The method of claim 1, further comprising:
  receiving, by the image server, a request for the container image;
  generating, by the image server, an image based on the file list for the container image; and
  sending, by the image server, the image in response to the request.

5. The method of claim 4, wherein generating, by the image server, the image based on the file list for the container image comprises:
  retrieving, by the image server, the plurality files from repository locations indicated in the file list for the container image; and
  including, by the image server, the plurality of files in the image.

6. The method of claim 4, wherein the image comprises a file system for a container.

7. A system, comprising one or more processors and a non-transitory computer-readable medium comprising instructions that, when executed by the one or more processors, cause the system to perform a method for reducing resource consumption in container image management, the method comprising:
  receiving, by an image server, from a client device, directory information and checksum information corresponding to a plurality of files of a container image;
  determining, by the image server, based on the directory information and the checksum information, whether each file of the plurality of files is present in a repository;
  sending, by the image server, to the client device, an indication to only transmit given files of the plurality of files determined by the image server not to be present in the repository, wherein the indication comprises one of:
- a list of the given files of the plurality of files determined by the image server not to be present in the repository; or
- a list of respective files of the plurality of files determined by the image server to be present in the repository;

receiving, by the image server, from the client device, the given files of the plurality of files determined by the image server not to be present in the repository;

for each respective file of the plurality of files that is determined by the image server to be present in the repository, updating, by the image server, a file list for the container image to indicate a respective location in the repository of the respective file; and for each given file of the plurality of files that is determined by the image server not to be present in the repository:
- storing, by the image server, the given file at a given location in the repository; and
- updating, by the image server, the file list for the container image to indicate the given location in the repository of the given file.

8. The system of claim 7, wherein determining, by the image server, based on the directory information and the checksum information, whether each respective file of the plurality of files is present in the repository comprises querying a file index using an identifier and a checksum of each respective file of the plurality files.

9. The system of claim 8, wherein the method further comprises, for each respective file of the plurality of files that is determined by the image server to be present in the repository, updating, by the image server, the file index to include a respective identifier and a respective checksum of the respective file.

10. The system of claim 7, wherein the method further comprises:
- receiving, by the image server, a request for the container image;
- generating, by the image server, an image based on the file list for the container image; and
- sending, by the image server, the image in response to the request.

11. The system of claim 10, wherein generating, by the image server, the image based on the file list for the container image comprises:
- retrieving, by the image server, the plurality files from repository locations indicated in the file list for the container image; and
- including, by the image server, the plurality of files in the image.

12. The system of claim 10, wherein the image comprises a file system for a container.

* * * * *